United States Patent [19]
Chenot et al.

[11] Patent Number: 5,651,584
[45] Date of Patent: Jul. 29, 1997

[54] LUMBAR SUPPORT STRUCTURE FOR AUTOMOTIVE VEHICLE

[75] Inventors: Louis A. Chenot, Carl Junction; Harold D. Long, Sarcoxie; Michael D. Fiechtl, Carl Junction; Verlie W. Coss, Joplin; Thomas E. Schuller, Webb City, all of Mo.

[73] Assignee: L & P Property Management Company, Chicago, Ill.

[21] Appl. No.: 427,613

[22] Filed: Apr. 24, 1995

[51] Int. Cl.$^6$ ............................................ A47C 7/46
[52] U.S. Cl. .............................. 297/284.4; 192/45
[58] Field of Search .......................... 297/284.4, 284.7; 192/41 R, 45, 47

[56] References Cited

U.S. PATENT DOCUMENTS

| | | | |
|---|---|---|---|
| 861,366 | 7/1907 | Jahn | 192/47 |
| 2,843,195 | 7/1958 | Barvaeus . | |
| 3,241,879 | 3/1966 | Castello et al. . | |
| 3,378,299 | 4/1968 | Sandor . | |
| 3,482,667 | 12/1969 | Hein | 192/45 |
| 3,596,990 | 8/1971 | Gottfried et al. . | |
| 3,762,769 | 10/1973 | Poschl . | |
| 3,890,000 | 6/1975 | Easley . | |
| 3,948,558 | 4/1976 | Obermeier et al. . | |
| 3,973,797 | 8/1976 | Obermeier et al. . | |
| 4,019,777 | 4/1977 | Hayashi . | |
| 4,148,522 | 4/1979 | Sakurada et al. . | |
| 4,153,293 | 5/1979 | Sheldon . | |
| 4,155,592 | 5/1979 | Tsuda et al. . | |
| 4,156,544 | 5/1979 | Swenson et al. . | |
| 4,159,847 | 7/1979 | Arai . | |
| 4,296,965 | 10/1981 | Sakurada et al. . | |
| 4,316,631 | 2/1982 | Lenz et al. | 297/284.4 |
| 4,354,709 | 10/1982 | Schuster . | |
| 4,452,485 | 6/1984 | Schuster . | |
| 4,550,949 | 11/1985 | Sakamoto . | |
| 4,576,410 | 3/1986 | Hattori . | |
| 4,627,661 | 12/1986 | Rönnhult et al. . | |
| 4,630,865 | 12/1986 | Ahs . | |
| 4,632,454 | 12/1986 | Naert . | |
| 4,715,653 | 12/1987 | Hattori et al. . | |
| 4,722,569 | 2/1988 | Morgenstern et al. . | |
| 4,725,095 | 2/1988 | Benson et al. . | |
| 4,810,033 | 3/1989 | Kemmann . | |
| 4,880,271 | 11/1989 | Graves . | |
| 4,909,568 | 3/1990 | Dal Monte . | |
| 4,995,490 | 2/1991 | Kanai | 192/45 |
| 5,007,677 | 4/1991 | Ozawa et al. . | |
| 5,026,116 | 6/1991 | Dal Monte . | |
| 5,050,930 | 9/1991 | Shuster et al. . | |
| 5,076,643 | 12/1991 | Colasanti et al. . | |
| 5,078,449 | 1/1992 | Suzuki . | |
| 5,087,098 | 2/1992 | Ishizuka . | |
| 5,099,972 | 3/1992 | Ouchi | 192/45 |
| 5,120,109 | 6/1992 | Ragoni . | |
| 5,174,526 | 12/1992 | Kanigowski . | |
| 5,174,629 | 12/1992 | Mizushima . | |
| 5,197,780 | 3/1993 | Coughlin | 297/284.7 |

(List continued on next page.)

FOREIGN PATENT DOCUMENTS

4314325  11/1994  Germany ................ 297/284.4

*Primary Examiner*—Peter R. Brown
*Attorney, Agent, or Firm*—Wood, Herron & Evans

[57] ABSTRACT

A lumbar support structure comprises a resilient grid formed of flexible vertical members and horizontal cross members. The grid is fixed in a seat, such as a car seat, and includes an upper back section and lumbar section. The lower end of the lumbar section is fixed and the upper end of the lumbar section is free and is coupled to cables connected to a cable wheel and clutch mechanism. Clutch mechanism rotates to wind the cable wheel and draw the cables to pull the free end of the lumbar section downward toward the fixed end. The lumbar section is bowed forwardly in the seat to provide lumbar support. The clutch mechanism comprises a clutch and locking pin which cooperate to rotate the cable wheel in both directions for adjusting the lumbar support. When the selected position for the lumbar support is chosen, the clutch is locked to maintain the bowed grid in a selected shape.

22 Claims, 3 Drawing Sheets

U.S. PATENT DOCUMENTS

| | | |
|---|---|---|
| 5,215,350 | 6/1993 | Kato . |
| 5,217,278 | 6/1993 | Harrison et al. .................... 297/284.7 |
| 5,224,757 | 7/1993 | Geitz et al. . |
| 5,286,087 | 2/1994 | Elton . |
| 5,314,236 | 5/1994 | Suzuki et al. . |
| 5,335,965 | 8/1994 | Sessini . |
| 5,397,164 | 3/1995 | Schuster et al .................. 297/284.4 X |

LUMBAR SUPPORT STRUCTURE FOR AUTOMOTIVE VEHICLE

FIELD OF THE INVENTION

The present invention relates generally to lumbar supports for seats and particularly to lumbar supports positioned in the seats of automotive vehicles.

BACKGROUND OF THE INVENTION

In the interest of driver comfort within an automotive vehicle, such as a car, it is generally known to provide support to the lumbar region of the back. Lumbar support structures are placed within the lower region of the seat back proximate to where the lumbar region of the driver's back would be located. Lumbar support structures move an area of the seat back forwardly in a direction generally perpendicular to the planar surface of the seat back and against the lumbar region of the driver to support the lumbar region. By supporting the lower vertebral structures of the lumbar region, lumbar support structures support the upper back and provide comfort for drivers, particularly long distance drivers.

While currently available lumbar support structures provide some support to the lumbar region, they often simultaneously cause discomfort to the driver. Particularly, many of the currently available lumbar supports utilize unitary structures, such as paddles, for support. Such paddle structures are generally hard and rigid and do not provide the necessary amount of flexibility which is necessary for accommodating the weight of the driver, the shape of the back, and any physical movement or shifting which occurs while driving. The rigid structures bear against the driver's lumbar region and cause localized areas of uncomfortable pressure in the lumbar region due to their rigidity and the rigidity of the spinal column. Consequently, the driver may have better back support, but will generally experience other discomforts.

Several of the existing lumbar support structures also utilize large numbers of complicated machine parts which increase the weight and cost of the structures, as well as their tendency to malfunction. Furthermore, even with advanced mechanics, adjustment of available lumbar support structures is often difficult. Some mechanical lumbar support structures utilize a handle which is turned by the driver for extending the lumbar support structure. Due to the construction of these lumbar support structures, the handle generally requires a substantial amount of torque in order to accomplish the desired adjustment. The required torque will often times increase as the lumbar support structure is extended further. As may be appreciated, the turning of a handle with high torque would be difficult if not impossible to accomplish when a person is driving. Furthermore, drivers may be too weak to conveniently adjust the lumbar support structures thus reducing their usefulness.

Another drawback to existing lumbar support structure is that many are not infinitely adjustable. For example, adjustments might be accomplished with a handle and a shaft which has a plurality of detents formed therein. Bearings or other suitable structures move into the detents when the handle is turned and a position is chosen. However, the lumbar support structures cannot be adjusted to positions in between the detents, and therefore, and only a limited number of discreet positions of lumbar support are available. As may be appreciated, many drivers will not be comfortable at one of the discreet positions and would be more properly supported by a position somewhere therebetween.

Those lumbar support structures which do provide infinite adjustment, do so by utilizing screw structures which require a large number of rotations of the handle to achieve the proper positioning. Furthermore, such screw structures often require high amounts of torque to turn them.

Therefore, it is an objective of the present invention to provide comfortable and flexible support for the lumbar region of a driver.

It is a further objective of the present invention to provide lumbar support for a driver without creating localized pressure points and discomfort to the driver.

It is a further objective of the present invention to provide a lumbar support which comfortably conforms to the shape of the driver's lumbar region and the weight of the driver as well as to the driver's movements made during driving.

It is a further objective of the present invention to provide lumbar support which may be readily and quickly modified without continuous manipulation of adjustment parts and without a high amount of physical exertion from the driver.

It is an objective of the present invention to provide a lumbar support structure which is lightweight, inexpensive to manufacture, easy to use and adjust, and reliable.

SUMMARY OF THE INVENTION

The present invention accomplishes the above-discussed objectives and other objectives of providing lumbar support which is resiliently adaptable to the shape, weight and movements of a seated person, such as the driver, and which is easily and readily adjusted. The lumbar support structure of the invention comprises a resilient wire grid including two generally parallel vertical members which are coupled together at their ends to form a base. The vertical members are preferably polyethylene coated wire which are resilient and may be bent along their length. A plurality of horizontal cross members extend between the vertical members to form a resilient lattice which will give under pressure. The vertical members are bent and configured to define a grid having a flexing lumbar section and an upper back section. The flexing lumbar section is flexed into a bow shape to project forwardly from a seat back to provide lumbar support.

The grid is coupled at a top end and a bottom end to the framework of a seat back to maintain the proper positioning of the lumbar section. The upper back section of the grid movably secures the top end of the grid to the seat back frame so that the upper end of the lumbar section may be moved toward the bottom end of the lumbar section. To provide lumbar support, the upper end of the flexible lumbar section is pulled downwardly toward the fixed lower end of the lumbar section so that the flexible lumbar section bows in shape and extends outwardly. When the lumbar section is bowed, the upper back section is slightly lowered. In a preferred embodiment, a pair of cables are connected at two spaced apart points at the upper end of the flexible lumbar section and each cable extends generally parallel to the respective vertical grid member. The cables are coupled through guide pulleys to a cable wheel which is rotated to wind the cables thereon and to draw the ends of the cables downwardly to bow the lumbar section of the grid.

The rotating cable wheel is coupled by a shaft to a rotating clutch mechanism comprising a clutch which rotates within a generally cylindrical housing. The rotating clutch has a plurality of outer locking surfaces around its periphery and the clutch mechanism includes a plurality of locking pins positioned between the outer locking surfaces and the inside surface of the housing. The locking pins are operable to wedge between the outer locking surfaces and the housing to lock the clutch when it is rotated in one direction and are operable to become unwedged so that the clutch may rotate in the opposite direction. Biasing springs around the clutch assist in forcing the locking pins into a wedged position. By locking the clutch, the cable wheel is locked to thereby maintain the bowed lumbar section in a loaded state for providing lumbar support.

To rotate the clutch and adjust the shape of the bowed lumbar section, a handle and rotatable input shaft are coupled to the clutch. The input shaft includes a plurality of radially extending fingers which act against surfaces of the clutch for rotation thereof when the handle is turned. When the clutch is rotated in one direction, such as the clockwise direction, the locking pins move with respect to the outer locking surfaces to automatically unwedge and unlock the clutch so that the clutch may be rotated in the clockwise direction to wind the cables on the cable wheel and bow the lumbar section. Under the load of the bowed lumbar section, the clutch will then desire to rotate counterclockwise because of the resiliency of the lumbar section and particularly the resiliency of the bowed vertical members. When the driver is done rotating the handle, the clutch rotates slightly counterclockwise and the pins move under the forces of friction and the springs to again wedge the locking pins between the clutch and the housing to lock the clutch at the selected position and maintain the bowed lumbar section in the selected shape.

To relax the bowed lumbar section and adjust the lumbar support, the clutch must be rotated in the opposite direction, such as in the counterclockwise direction. However, as discussed, the locking pins will automatically wedge when the clutch is rotated in the counterclockwise direction because of the configuration of the clutch locking surfaces and the biasing of the locking pins toward the locking surfaces by the springs. To produce counterclockwise movement of the clutch, the handle is turned counterclockwise and the fingers of the input shaft engage the locking pins to push the pins away from the locking surfaces and against the respective springs thereby unwedging the pins and unlocking the clutch so that it may rotate. When the turning of the handle stops, the pins are returned to the wedged position by friction and the springs and the clutch are again locked. Preferably, the clutch, housing, and locking pins are configured so that when the pins are unwedged, there is sufficient friction between the clutch, pins and the housing so that the clutch rotates slowly in the counterclockwise direction and the bowed lumbar section which is under load does not snap into a fully extended rest position. In that way, the lumbar section is bowed and unbowed in a slow and controlled manner for easy, precise adjustment of the lumbar support.

To provide easy adjustment without high amounts of torque, the cable wheel of the invention preferably has an elongated radial cam portion for increasing the moment arm of the wheel as the cable is drawn and the lumbar section bowed. The elongated radial cam portion is positioned such that it is engaged when the load of the bowed lumbar section begins to increase, beyond a desirable level, the torque necessary to further rotate the wheel and bow the lumbar section. The increased moment arm of the wheel offsets the torque increase of the loaded lumbar section and preferably takes affect after approximately the first 25% of the flex of the lumbar section. Thereafter, the necessary load force curve flattens and the driver realizes a continuous torque force for adjusting the lumbar section, even at its most bowed and loaded position. In a preferred embodiment, full forward extension of the lumbar support is achieved in a 90° turn of the handle. However, other wheel configurations might be utilized requiring 180°, 360° or several 360° revolutions. Thereby, the present invention provides easy, rapid and precise adjustment of the lumbar support structure without requiring continual rotation of a handle as is necessary with other lumbar support mechanisms utilizing screws.

The lumbar section of the grid is generally infinitely adjustable so that the lumbar support may be adjusted to the contour of the driver. In combination with the resiliency and flexibility of the grid, the adjustability of the invention provides comfortable lumbar support while the lattice of grid wires provides a hammocking effect for lumbar support without localized pressure points to cause discomfort. The clutch mechanism of the invention is easily turned in either direction to adjust the support without requiring a high amount of torque. Therefore, the lumbar support structure is adjusted easily in a full range of motion by a driver with one hand while the driver is concentrating primarily on the task of driving. Furthermore, the easily rotated clutch mechanism is suitable for those persons who are too weak to handle the high torque required by currently existing lumbar support mechanisms. The rotating shaft is coupled to a handle for manual adjustment or may be appropriately coupled to a motorized adjustor.

The lumbar support structure of the invention is lightweight and may be fabricated relatively inexpensively to provide a compact design which is reliable and easily operated while providing comfortable lumbar support to a seated person.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENT

Figure 1:
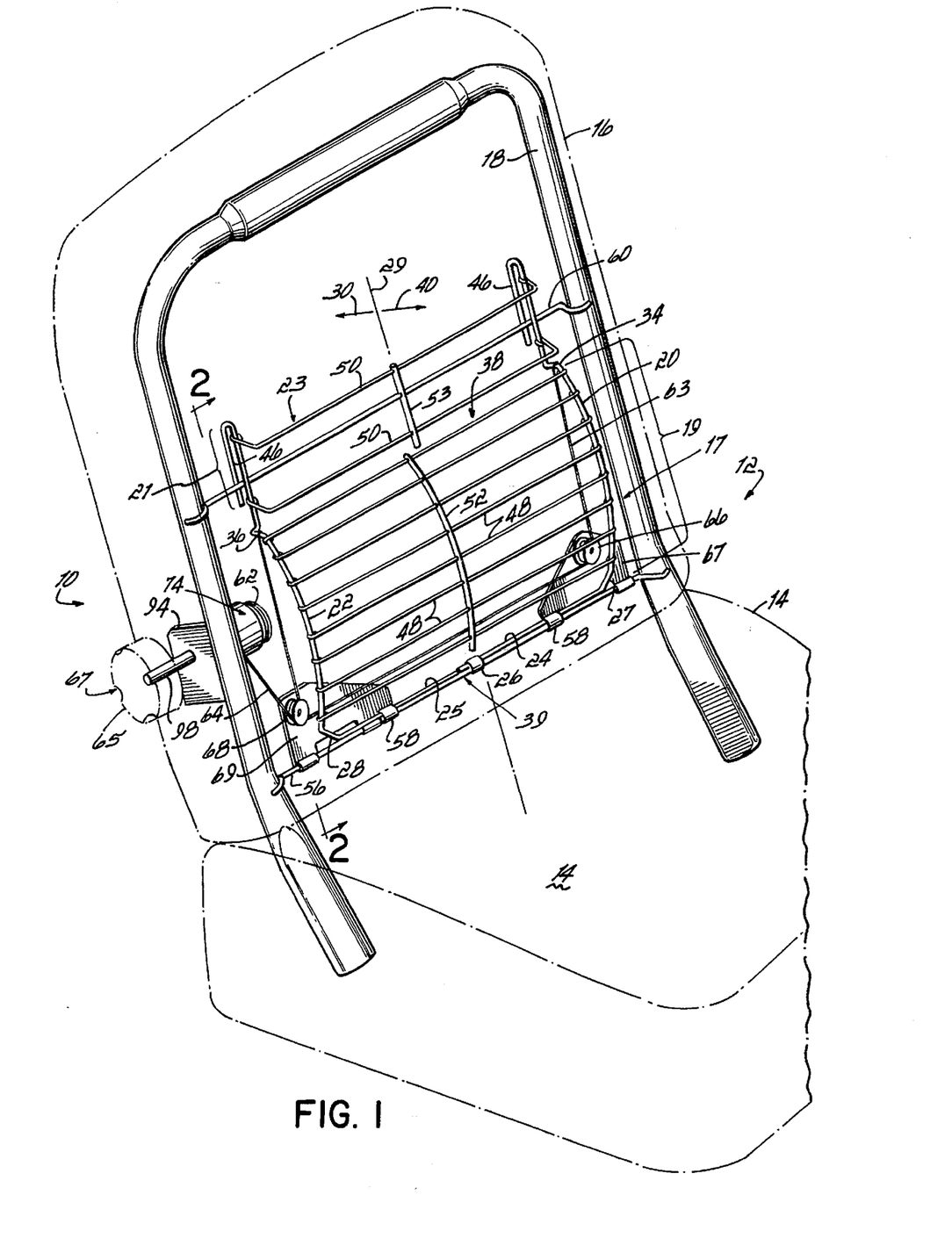
FIG. 1 is a perspective view of the lumbar support structure of the invention shown incorporated into the back support of a seat.

FIG. 1 illustrates the lumbar support structure 10 of the present invention incorporated into a seat 12, such as a seat typically used in an automotive vehicle. While the lumbar support structure 10 of the invention is described herein within the context of an automotive vehicle seat, it will be understood that the lumbar support structure might also be utilized with a stationary seat or chair. Seat 12 includes a generally horizontal lower section 14 for supporting the legs and buttocks of a seated person such as the driver of an automotive vehicle (not shown). Seat 12 also includes a seat back section 16 which extends at an angle to lower section 14 and supports the back and shoulders of the driver. The lower section 14 and seat back section 16 would generally include fabric or leather covering and associated padding to cover the seat frame including frame member 18 for providing supportive comfort to the driver.

The lumbar support structure 10 comprises a flexible grid 17 which is divided into a lumbar section 19 and an upper back section 21. The grid 17 includes two generally parallel vertical members 20, 22 which are preferably 13 gauge, oil-tempered wire coated with polyethylene and form a flexible border for the grid 17. The vertical wire members 20, 22 are formed to have integral horizontal base sections 24, 25, respectively, which are attached together such as by clip 26 to provide a unitary base for the resilient grid 17. The lumbar support is provided by bowing the lumbar section 19 so that it projects forwardly to push a portion of seat back 16 forwardly. The top end 23 of grid 17 coincides with the upper end of the upper back section 21 while the bottom end of grid 17 coincides with the lower end 39 of the lumbar section 19. Similarly, the upper end 38 of the lumbar section coincides with the lower end of the upper back section 21.

The vertical members 20, 22 are bent to form lower corners 27, 28 of lumbar section 19. The corners 27, 28 are angled inwardly with respect to the center axis 29 of lumbar section 19 and are angled rearwardly in the direction of arrow 30 into the seat back 16. As described further hereinbelow, the angled lower corners 27, 28 are operable to apply an outward force on the respective vertical members 20, 22 when the lumbar section 19 is bowed. The lower corners 27, 28 are preferably bent rearwardly in the direction of arrow 30 approximately 45° to the respective vertical members 20, 22 to prevent kinking of the vertical members when the lumbar section is bowed (see FIGS. 2 and 3).

Figure 2:
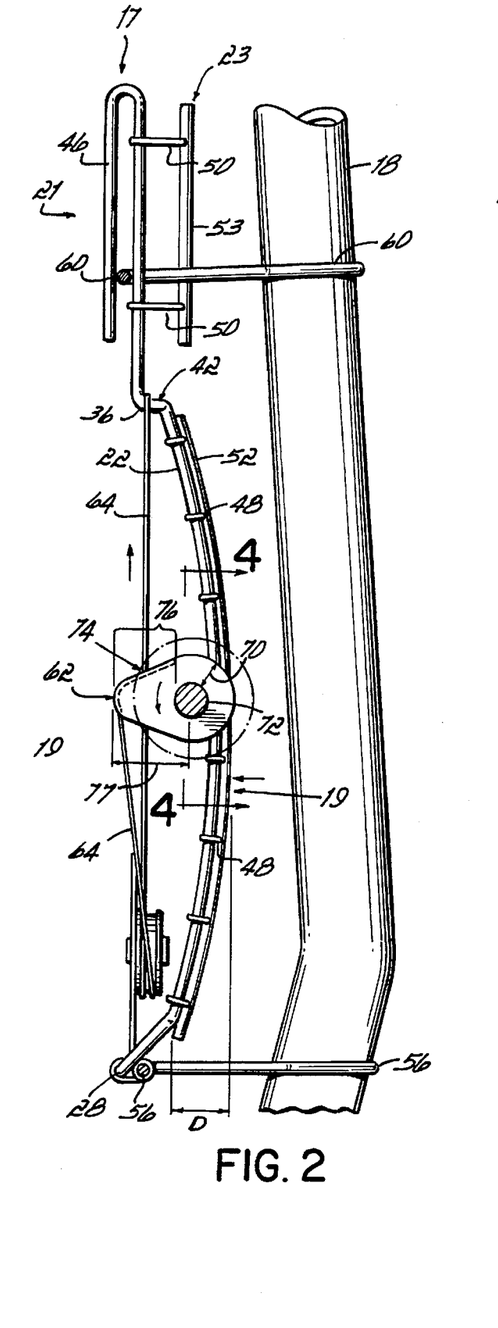
FIG. 2 is a cross-sectional view of FIG. 1 along lines 2—2.
Figure 3:
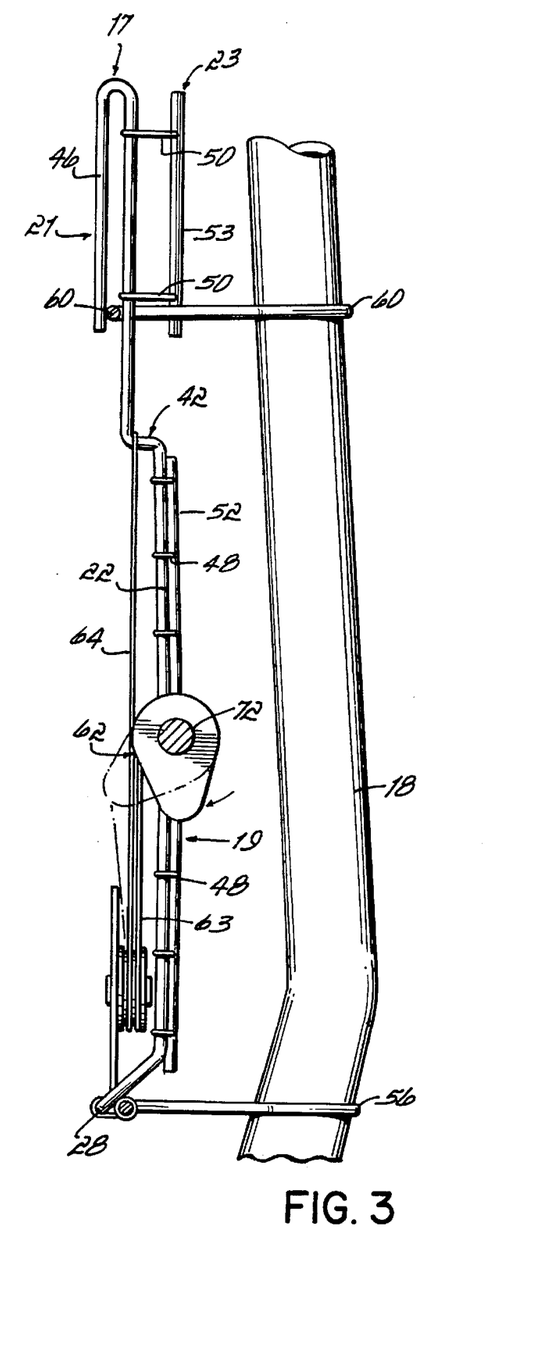
FIG. 3 is a cross-sectional view similar to FIG. 2 showing the resilient grid of the lumbar support structures unbowed in an unloaded state.

The vertical wire members 20, 22 are also bent to form upper corners 34, 36 of lumbar section 19 to provide attachment points so that the upper end 38 of lumbar section 19 can be pulled downwardly toward the lower end 39 of the lumbar section 19 such that the lumbar section bows forwardly in the direction of arrow 40 to provide lumbar support to the driver. As illustrated in FIGS. 1, 2 and 3, the upper corners 34, 36 are also preferably bent inwardly toward the center axis 29 and rearwardly in the direction of arrow 30.

The vertical members 20, 22 extend vertically upward from upper corners 34, 36 to form upper back section 21. When the lumbar section 19 is bowed, the upper back section 21 moves vertically downwardly as illustrated in FIG. 2, but does not bow forwardly like lumbar section 19. Vertical members 20, 22 each terminates at the top end of the grid in a 180° bend which includes a downwardly extending section 46 which loops over a frame wire 60 to secure grid 17 at its top end (see FIG. 1).

The grid 17 includes a plurality of flexible horizontal cross members. Lumbar section 19 includes wire cross members 48 preferably formed of 14 gauge oil-tempered wire. The cross members 48 extend generally horizontally between and perpendicular to the vertical members 20, 22.

To secure the cross members 48, the wires are preferably wrapped around the vertical members 20, 22. The upper back section 21 also includes generally horizontal cross members 50 which extend between vertical members 20, 22. Cross members 50 are bent forwardly as illustrated in FIGS. 2 and 3 such that the cross members 50 lie in a plane which is generally coplanar with the unbowed lumbar section 19. The unbowed lumbar section 19 rests in a forward position due to the forward bends of the corners 27, 28 and 34, 36. Bending the cross members 50 forwardly adds resiliency to the upper back section 21. Both the lumbar section 19 and the upper back section 21 include respective auxiliary vertical members 52, 53 which may be formed of paper rope, polyethylene tubing or polyurethane coated wire. The wire cross members 48, 50 extend through openings formed in the respective auxiliary vertical members 52, 53, and the auxiliary vertical members are operable to maintain the chosen vertical spacing of the cross members 48, 50. Auxiliary vertical member 52 is resilient and may be used to increase the stiffness of the lumbar section. The auxiliary member will flex into a bowed shape when lumbar section 19 is bowed as will now be described.

As illustrated in FIG. 1, the lower end 39 of lumbar section 19, which coincides with the bottom end of the entire grid 17, is coupled to a lower structural wire 56 which is often utilized within a seat back 16 for the purpose of anchoring a seat cover (not shown). The lower end 39 is attached to wire 56 with clips 58, and wire 56 provides a fixed point of stability for grid 17 to restrain rearward motion of the grid 17 into the seat back 16 and to partially support the load on the grid 17. The upper structural wire 60, which is usually utilized to support foam padding, secures the upper end 38 of grid 17. Particularly, the top sections of the vertical members 20, 24, which form the upper back section 21 including sections 46, wrap around structural wire 60 forwardly and rearwardly thereof as illustrated in FIGS. 2 and 3. Wire 60 inhibits the rearward (arrow 30) and forward (arrow 40) movement of grid 17 but allows the grid to move vertically up and down when the lumbar section 19 is bowed for lumbar support (see FIGS. 2 and 3).

Referring now to FIG. 2, cables are connected to the upper corners 34, 36 of the lumbar section 19 and the cables extend to a cable wheel 62 and are attached thereto to be wound around the cable wheel 62. Specifically, cable 63 is attached to upper corner 34 (see FIG. 1), such as by being wrapped around the upper corner, and cable 64 is similarly attached to upper corner 36. Cable 63 extends vertically downward from upper corner 34 and around a guide pulley 66 which is coupled proximate the lower corner 27 of lumbar section 19 by a bracket 67 which is attached to wire 56. Cable 63 extends across the lumbar section 19 generally parallel lower end 39 and is also wrapped around a guide pulley 68 which is mounted to wire 56 by bracket 69 proximate the other lower corner 28 of lumbar section 19. Cable 64 extends downward from corner 36 and also wraps around guide pulley 68 and extends vertically upward to cable wheel 62. When cable wheel 62 rotates, it draws the cables 63, 64 around pulleys 66, 68 to draw the upper corners 34, 36 downwardly toward the lower corners 27, 28 as illustrated in FIGS. 1 and 2. As the cable is drawn, the lumbar section 19 is bowed forwardly in the direction of arrow 40 to provide lumbar support to a seated driver.

The rearwardly extended wire sections 42 at the upper corners 34, 36 and lower corners 27, 28 act as moment arms for bowing the lumbar section 19, thus reducing the torque that is necessary on cable wheel 62 for turning and drawing the cables to provide lumbar support. Furthermore, the inwardly bent wire sections at upper corners 34, 36 and lower corners 27, 28 cause the vertical members to bow slightly outwardly thereby stretching the horizontal cross members 48 taut. When the lumbar section 19 is bowed forwardly, it provides a resilient and comfortable lattice for supporting the lumbar region of a driver. The resilient lattice of the lumbar section 19 flexes to comfortably adjust to the shape of the driver's lumbar region and also to the weight and movement of the driver. Thus, the lumbar region is supported by cradling the region on a resilient wire lattice or grid without creating localized pressure points which may cause discomfort to the driver. The upper back section 21 of grid 17 is also resilient and flexes with the lumbar section 19 at the upper corners 34, 36 to support the upper back and further provide comfort to the driver. The wire grid 17 of the invention is lightweight and relatively inexpensive to fabricate. Furthermore, the grid is very durable and is not subject to malfunction due to its simple operation.

The cable wheel 62 of the present invention is uniquely shaped to provide quick and easy adjustment of the lumbar section 19. As illustrated in FIGS. 2 and 3, the cable wheel 62 has a defined radius 70 over a predominant portion of the wheel and rotates on axis 72. The radius 70 defines a moment arm for wheel 62 to aid in winding the cables 63, 64. Axis 72 is coupled to a clutch mechanism 74 described further hereinbelow for rotating the shaft 72 and cable wheel 62 and locking the wheel 62 and lumbar section 19 in a selected position. Cable wheel 62 also has an elongated radial portion 76 so that the wheel 62 acts effectively as a cam when it is rotated. The elongated radial portion 76 has a radius 77 greater than radius 70 and provides an effective moment arm which is greater than the moment arm produced by the portion of the wheel defined by radius 70. As illustrated in FIG. 3, the elongated radial portion 76 is directed vertically downward, or for reference, in the six-o'clock position, when the lumbar section 19 is not bowed and is in an unflexed and unloaded state. As wheel 62 is rotated clockwise, the cables 63, 64 are wound on wheel 62 and are eventually drawn over larger radius 77 defined by the elongated radial portion 76. In that way, the cables are drawn relatively more easily to bow lumbar section 19 so that it projects forwardly to provide lumbar support (see FIG. 2).

As may be appreciated, as the lumbar section 19 bows, the amount of load produced on cables 63, 64 is steadily increased. This would normally require a steady increase in the torque on wheel 62 to further draw the cables 63, 64 and bow the lumbar section 19. The lumbar support structure 10 of the present invention adjusts to the increase in torque to generally provide a flat torque response felt by the driver. As illustrated in FIG. 3, when lumbar section 19 is unflexed and generally flat, and the elongated radial cam portion 76 is at six o'clock, the cables 63, 64 are drawn on the smaller radius 70 of wheel 62. As wheel 62 rotates clockwise, the cable 63, 64 are drawn and the lumbar section 19 is bowed forwardly (see FIG. 2). To coincide with the increased torque necessary to turn the wheel 62 when lumbar section 19 is bowed, the cables are eventually drawn over the elongated radial portion 76 such that the effective moment arm presented by wheel 62 is increased and the torque necessary to turn the wheel 62 is decreased.

Preferably, the increased load presented by the bowed lumbar section 19 is offset by the decrease in the torque necessary to turn wheel 62 and draw the cables so that the driver feels a smooth and constant realized torque as the wheel 62 is turned. Preferably, the full range of forward motion of the bowed lumbar section 19 is realized as the elongated radial portion 76 goes from six o'clock to nine o'clock, i.e., within a 90° turn of wheel 62 (see FIG. 3). The projection distance D of the forwardmost point of the bowed lumbar section 19 from the unloaded, rest position is preferably between ½ and 1 inch, which has been determined from anthropomorphic data to encompass the average variation in the shapes of the lumbar regions of humans (see FIG. 2). Therefore, using the lumbar support structure 10 of the invention, the driver may easily and readily adjust the lumbar section 19 without experiencing large increases in the necessary torque, even when the lumbar section is at or close to its forwardmost projection. Furthermore, full adjustment of lumbar section 19 is achieved in a 90° rotation of wheel 62. As may be appreciated by a person of ordinary skill in the art, the configuration of wheel 62 and its relation with respect to the lumbar section 19 might be adjusted such that a 180° motion or 360° motion of wheel 62 is necessary for full forward extension of lumbar section 19. Furthermore, if the lumbar section 19 is trimmed with a stiff material such as leather or a stiff foam pad, or if a tightly stretched cover is used over the lumbar section 19, a gear mechanism (not shown) might be coupled between the wheel 62 and clutch mechanism 74 for providing smooth and relatively easy adjustment of the lumbar support structure 10.

Figure 7:
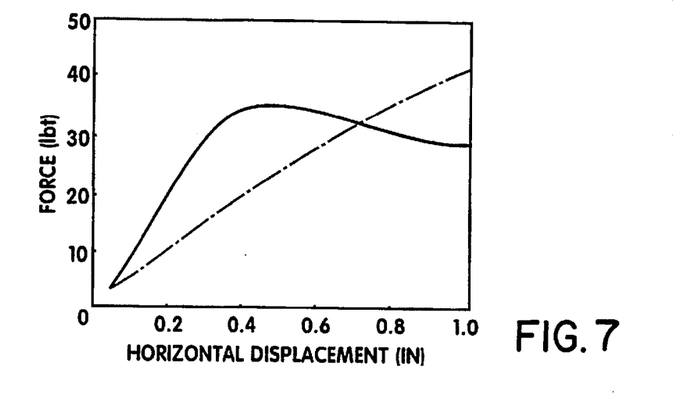
FIG. 7 is a graph illustrating the flat load curve created by the present invention for easy adjustment of the lumbar support structure.

FIG. 7 graphically illustrates the graph of a load curve which is achieved with and without the cable wheel 62 of the present invention. In FIG. 7, the vertical axis indicates the pounds of load force required to bow the lumbar section 19 while the horizontal axis indicates the horizontal displacement of the lumbar section 19 in inches. Curve 80 on the graph approximates the load curve presented by the bowed lumbar section 19 of grid 17, without the cable wheel 62 of the invention. Curve 80 is for a lumbar section 19 which has been trimmed with foam and a cover utilized with typical seat back construction. As seen, the amount of load required will steadily increase as the cables are drawn and the lumbar section 19 continues to flex and become more bowed. As a result, the force required to further bow the lumbar section 19, which is felt by the driver for manually adjusted lumbar support structures, will steadily increase as shown by the steady rise of curve 80. However, as illustrated by curve 82, the cable wheel 62 of the invention, including the elongated radial portion 76, flattens out the curve such that as the horizontal displacement of the lumbar section 19 increases, the pounds of load transferred to the driver and experienced as torque on wheel 62 remains somewhat continuous and actually slightly decreases. Therefore, a handle 65 coupled to wheel 62 by clutch mechanism 74 is preferably turned by continuous type forces when the lumbar section is bowed to a selected position.

Figure 4:
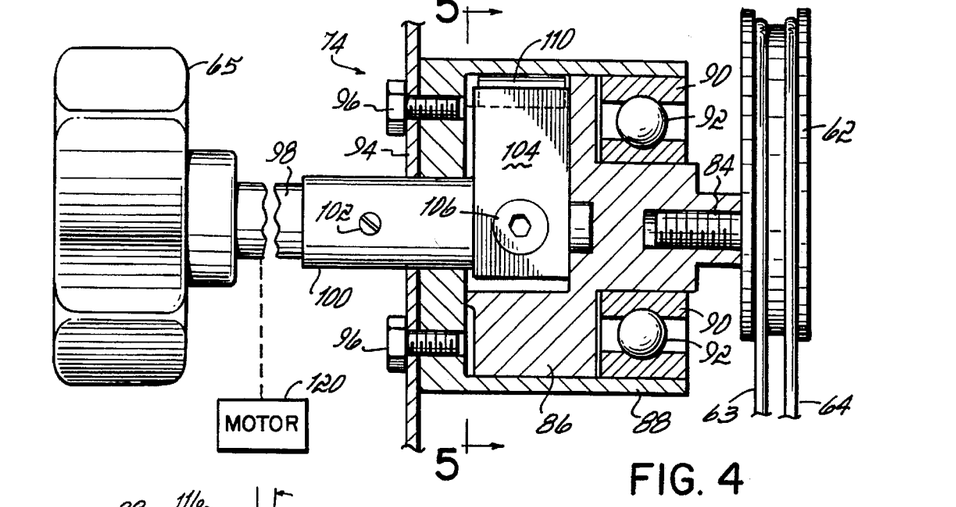
FIG. 4 is a cross-sectional view along lines 4—4 of FIG. 2 illustrated the clutch mechanism of the invention.
Figure 5:
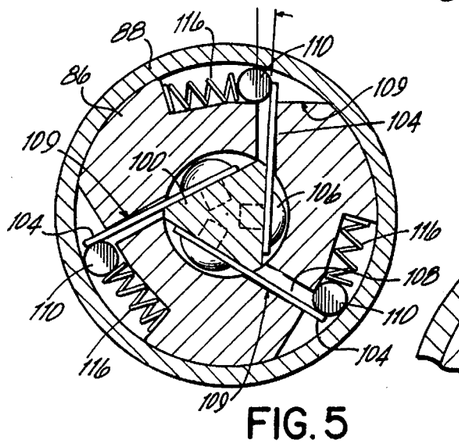
FIG. 5 is a cross-sectional view along lines 5—5 of FIG. 4.
Figure 6:
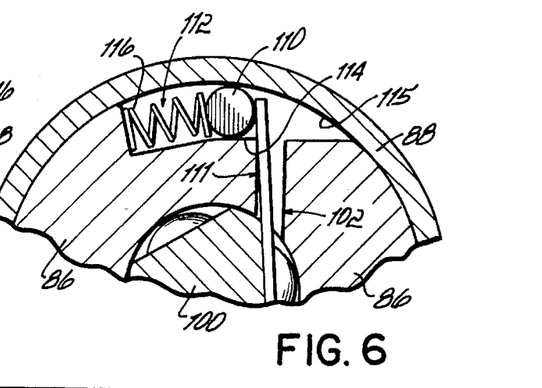
FIG. 6 is an enlarged view of a section of FIG. 5 showing the locking pins of the clutch mechanism in an unwedged state.

FIGS. 4, 5 and 6 illustrate the clutch mechanism 74 of the invention in greater detail. FIG. 4 is a cross-sectional view along lines 4—4 of FIG. 2, showing the clutch mechanism 74 and handle 65 and cable wheel 62 coupled to clutch mechanism 74. Cable wheel 62 is coupled, such as by a screw or bolt 84, to a generally cylindrically-shaped clutch 86 which is configured to rotate within a cylindrical housing 88. Rotation of clutch 86 rotates cable wheel 62. A bearing structure 90 with ball bearings 92 provides smooth rotation of clutch 86 in housing 88. Housing 88 is fixed to a mounting bracket 94 by bolts 96. Handle 65 is connected to a rotatable shaft 98 which, in turn, is fixed to an input shaft 100 by set screws 102. Rotation of handle 65 rotates input shaft 100.

As illustrated in FIG. 5, the input shaft 100 includes a plurality of radially extending tabs or fingers 104 which are attached to input shaft 100 by appropriate bolts or screws 106. The radially extending fingers 104 extend through slots 108 formed in clutch 86. When input shaft 100 rotates, the fingers 104 act against the clutch 86 to rotate the clutch and, in turn, rotate cable wheel 62. Therefore, rotation of handle 65 rotates wheel 62. The clutch mechanism 74 also includes a plurality of locking pins 110 which are positioned around the outer periphery of clutch 86. The locking pins 110 are generally cylindrically shaped and roll within sloped indents 112 formed at the outer periphery of clutch 86. Clutch 86 and housing 88 are preferably steel, while the locking pins are brass. The embodiment of the invention described herein utilizes a plurality of locking pins. However, a single locking pin 110 might also be utilized with clutch mechanism 74 without departing from the scope of the present invention.

Referring the FIG. 6, each sloped indent 112 includes a flat outer locking surface 114 which cooperates with the inside surface 115 of housing 88 to wedge the locking pins 110 between the housing 88 and clutch 86 to lock the clutch 86 and prevent it from rotating with respect to the housing 88. Biasing devices, such as rectangular springs 116, bias the locking pins 110 toward the locking surfaces 114 in the indents 112 for locking the clutch 86.

Referring to FIG. 5, when the input shaft 100 is rotated clockwise by handle 65, the fingers 104 engage clutch 86 at sides 109 of the slots 108 to rotate the clutch in a clockwise direction. The friction between the locking pins 110 and the inside surface 115 of housing 88 rolls or pushes the locking pins in a counterclockwise direction against biasing springs 116 and slightly away from the outer locking surfaces 114 to unwedge the locking pins 110 and effectively unlock the clutch 86. The clutch 86 and pulley wheel 62 are then rotated by the rotational forces on handle 65, such as by a driver. As cable wheel 62 turns, the cables 63, 64 are drawn and the lumbar section 19 is bowed creating a load on the cables, wheel 62, and clutch 86. When the rotational forces on handle 65 are withdrawn, the bowed lumbar section 19 under load will seek to snap back into an unflexed, unloaded position. Therefore, the loaded lumbar section 19 will seek to rotate the clutch counterclockwise. When the clutch rotates counterclockwise, the locking pins 110 are rolled backward to the locking surfaces 114 by the friction against surface 115 and by the biasing forces of springs 116. The locking pins become wedged again and the clutch 86 is locked in a selected position as chosen by the driver for providing proper lumbar support. Therefore, when the clutch is rotated clockwise, such as to increase the outward projection of the lumbar section 19, the pins 110 will automatically be unwedged and will again be wedged when the driver has reached the desired position and releases handle 65. As illustrated in FIG. 6, the displacement of pins 110 between wedging and unwedging is not large relative the clutch, and constant contact is maintained between the clutch 86, pins 110 and housing 88 during rotation of the clutch.

To adjust the lumbar support structure 12 in the opposite direction, such as, to decrease the outward projection of the lumbar section 19, the looking pins must again be unlocked to rotate the clutch counterclockwise. However, as discussed above, the counterclockwise rotation of clutch 86 will tend to wedge pins 110 and lock the clutch. Referring again to FIG. 6, when handle 65 is rotated in a counterclockwise direction, the input shaft 100 directs fingers 104 against clutch surface 111 and against the locking pins 110 to roll the locking pins 110 in a counterclockwise direction in the indents 112, against the bias of springs 116 and away from locking surfaces 114. The looking pins 110 are thus unwedged by fingers 104 from between clutch 86 and housing 88, thereby unlocking the clutch 86 to rotate in a counterclockwise direction. While the handle 65 is rotated counterclockwise, the fingers 104 hold the pins 110 in an unwedged state. As a result, the cable wheel 62 may be rotated counterclockwise to release cable 63, 64 so that the shape of lumbar section 19 is adjusted. Preferably, the dimensions of the clutch 86, housing 88 and locking pins 110, as well as the applicable biasing forces presented by springs 116 are selected so that the friction provided by the unwedged rolling pins are sufficient to prevent clutch 86 from rotating rapidly in the counterclockwise direction. Therefore, the lumbar section 19 is prevented from snapping into its unflexed rest position. Handle 65 is rotated smoothly in a counterclockwise direction for adjustment of the lumbar support structure 12. When the counterclockwise motion of handle 65 has ceased, the fingers 104 are no longer forced against pins 110 and the biasing forces of springs 116 and the friction of the rotational clutch 86 again move the locking pins 110 to their wedged positions, thus locking wheel 62 and the lumbar section 19 in the selected position. Therefore, the lumbar section of the present invention may be adjusted smoothly in either direction by rotation of handle 65 and locked in the selected position by simply ceasing the rotation of handle 65.

The Figures illustrate a clutch mechanism 74 which has been arranged so that clockwise motion of the clutch 86 projects the lumbar section 19 and the counterclockwise motion of the clutch 86 allows the lumbar section 19 to retract. However, as understood by a person of ordinary skill in the art, the clutch mechanism might be arranged so that similar effects occur by opposite rotational directions. That is, projection of the lumbar section 19 with counterclockwise motion. Furthermore, a motor 120 might be appropriately coupled to the input shaft 100 to rotate the clutch whereby adjustment of the lumbar support is motorized and controlled by the driver.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A lumbar support structure for supporting the lumbar region of a seated person comprising:

a resilient lumbar grid with opposing ends, the lumbar grid configured for being coupled to a back support of a seat and having a fixed end and an opposing free end;

at least one cable coupled to the free end of the lumbar grid, the cable operable to pull the lumbar grid free end toward the grid fixed end to bow the resilient lumbar grid in an outward direction against the back support and against the lumbar region of a person in the seat;

a rotating clutch mechanism coupled to the cable and being freely rotatable in at least one direction to a selected position to draw the cable and bow the resilient lumbar grid, the clutch mechanism comprising a housing, a clutch rotatable within the housing, and at least one locking pin positioned around the clutch between a surface of the clutch and a surface of the housing, the locking pin operable to wedge between the clutch surface and the housing surface when the clutch is rotated in one direction for locking the clutch in the selected position and maintaining the bowed lumbar grid in a selected shape to provide lumbar support to a seated person, the clutch mechanism further comprising a radially extending finger passing through an opening in the clutch to engage said locking pin, the finger, when rotated in said one direction, operable to simultaneously engage said locking pin and a portion of said clutch to thereby simultaneously unwedge the pin and rotate the clutch in said one direction.

2. The lumbar support structure of claim 1 wherein the resilient lumbar grid comprises two flexible and generally vertical members and at least one generally horizontal cross member extending between the vertical members, the lumbar grid members cooperating to provide a relatively large area of lumbar support.

3. The lumbar support structure of claim 1 further comprising a cable wheel coupled with the clutch mechanism and the cable, the cable wheel operable for rotating with the clutch mechanism to wind the cable thereon and draw the cable.

4. The lumbar support structure of claim 3 wherein the cable wheel includes an elongated radial portion which provides an effective moment arm greater than another effective moment arm created by another portion of the wheel, the elongated radial portion effectively reducing the rotational force required to rotate the cable wheel and draw the cable as the lumbar grid is bowed.

5. The lumbar support structure of claim 1 further comprising a plurality of locking pins positioned at spaced positions around the clutch between clutch surfaces and the housing surface to evenly lock the clutch at several points.

6. The lumbar support structure of claim 1 wherein the clutch is configured such that the locking pin automatically unwedges and the clutch unlocks when the clutch is rotated in a direction opposite said one direction and the pin again subsequently wedges when the clutch rotates in said one direction.

7. The lumbar support structure of claim 1 wherein the clutch mechanism further comprises a biasing device to bias the locking pin to wedge between the clutch surface and housing surface to lock the clutch.

8. The lumbar support structure of claim 1 further comprising a rotatable shaft coupled to the clutch for rotating the clutch.

9. The lumbar support structure of claim 1 further comprising a rotatable handle coupled to the clutch for manually rotating the clutch to bow the resilient lumbar grid and provide lumbar support.

10. The lumbar support structure of claim 1 further comprising a motor coupled to the clutch for rotating the clutch to bow the resilient lumbar grid and provide lumbar support.

11. The lumbar support structure of claim 1 further comprising an upper back grid coupled to the fixed end of the lumbar grid, the upper back grid providing support to the upper back of the seated person.

12. The lumbar support structure of claim 1 further comprising two cables, an end of each cable coupled to a respective opposing corner of the free end of the lumbar grid, the other ends of the cables coupled to the clutch mechanism for being drawn to bow the lumbar grid from the free end corners.

13. A lumbar support structure for supporting the lumbar region of a seated person comprising:

a resilient lumbar grid with opposing ends, the lumbar grid configured for being coupled to a back support of a seat and having a fixed end and an opposing free end;

a linkage device coupled to the free end of the lumbar grid and operable to force the lumbar grid free end toward the grid fixed end to bow the resilient lumbar grid in an outward direction against the back support and against the lumbar region of a person in the seat;

a clutch mechanism coupled to the linkage device, the clutch mechanism movable to a selected position to move the linkage and bow the resilient lumbar grid, the clutch mechanism comprising a housing, a clutch rotatable within the housing, and at least one locking pin positioned around the clutch between a surface of the clutch and a surface of the housing, the locking pin operable to wedge between the clutch surface and the housing surface when the clutch is rotated in one direction for locking the clutch in the selected position and maintaining the bowed lumbar grid in a selected shape to provide lumbar support to a seated person, the clutch mechanism further comprising a radially extending finger passing through an opening in the clutch to engage said locking pin, the finger, when rotated in said one direction, operable to simultaneously engage said locking pin and a portion of said clutch to thereby simultaneously unwedge the pin and rotate the clutch in said one direction.

14. The lumbar support structure of claim 13 wherein the linkage device includes at least one cable coupled to the free end of the lumbar grid, the clutch mechanism operable to draw the cable and pull the free end toward the grid fixed end to bow the lumbar grid.

15. A seat structure for comfortably supporting a seated person, the seat structure comprising:

a bottom section to support the buttocks and legs of a person; a seat back section to support the back of a person;

a resilient lumbar grid with a fixed end and an opposing free end, the lumbar grid coupled to the seat back section;

a linkage device coupled to the free end of the lumbar grid and operable to force the lumbar grid free end toward the grid fixed end to bow the resilient lumbar grid in an outward direction against the seat back section and against the lumbar region of a person in the seat structure;

a clutch mechanism coupled to the linkage device, the clutch mechanism movable to a selected position to move the linkage and bow the resilient lumbar grid, the clutch mechanism comprising a housing, a clutch rotatable within the housing, and at least one locking pin positioned around the clutch between a surface of the clutch and a surface of the housing, the locking pin operable to wedge between the clutch surface and the housing surface when the clutch is rotated in one direction for locking the clutch in the selected position and maintaining the bowed lumbar grid in a selected shape operable to provide lumbar support to a seated person, the clutch mechanism further comprising a radially extending finger passing through an opening in the clutch to engage said locking pin, the finger, when rotated in said one direction, operable to simultaneously engage said locking pin and a portion of said clutch to thereby simultaneously unwedge the pin and rotate the clutch in said one direction.

16. The seat structure of claim 15 wherein the linkage device includes at least one cable coupled to the free end of the lumbar grid, the clutch mechanism operable to draw the cable and pull the free end toward the grid fixed end to bow the lumbar grid.

17. The seat structure of claim 16 further comprising a cable wheel coupled to the clutch mechanism and the cable, the cable wheel being rotatable by the clutch mechanism to wind the cable thereon, the cable wheel including an elongated radial portion which provides an effective moment arm greater than an effective moment arm created by another portion of the wheel, the elongated radial portion effectively reducing the rotational force required to rotate the cable wheel and wind the cable as the lumbar grid is bowed.

18. The seat structure of claim 15 wherein the clutch is configured such that the locking pin automatically unwedges and the clutch unlocks when the clutch is rotated in a direction opposite said one direction and the pin again subsequently wedges when the clutch rotates in said one direction.

19. The seat structure of claim 15 further comprising a rotatable handle coupled to the clutch for manually rotating the clutch to bow the resilient lumbar grid and provide lumbar support.

20. The seat structure of claim 15 further comprising a motor coupled to the clutch for rotating the clutch to bow the resilient lumbar grid and provide lumbar support.

21. A lumbar support structure for supporting the lumbar region of a seated person comprising:

a resilient lumbar grid with opposing ends, the lumbar grid configured for being coupled to a back support of a seat and having a fixed end and an opposing free end;

at least one cable coupled to the free end of the lumbar grid, the cable operable to pull the lumbar grid free end toward the grid fixed end to bow the resilient lumbar grid in an outward direction against the back support and against the lumbar region of a person in the seat;

a cable wheel operable for rotating to wind the cable thereon and draw the cable;

a rotating clutch mechanism coupled to the cable wheel and being freely rotatable in at least one direction to a selected position to rotate the wheel and draw the cable for bowing the resilient lumbar grid, the clutch mechanism operable to lock at said selected position to maintain the bowed lumbar grid in a loaded state;

the cable wheel including an elongated radial portion which provides an effective moment arm greater than another effective moment arm created by another portion of the wheel, the elongated radial portion effectively reducing the rotational force required to rotate the cable wheel and draw the cable as the lumbar grid is bowed for providing lumbar support to a seated person.

22. A seat structure for comfortably supporting a seated person, the seat structure comprising:

a bottom section to support the buttocks and legs of a person;

a seat back section to support the back of a person;

a resilient lumbar grid with a fixed end and an opposing free end, the lumbar grid coupled to the seat back section;

at least one cable coupled to the free end of the lumbar grid, the cable operable to pull the lumbar grid free end toward the grid fixed end to bow the resilient lumbar grid in an outward direction against the seat back section and against the lumbar region of a person in the seat structure;

a cable wheel operable for rotating to wind the cable thereon and draw the cable;

a rotating clutch mechanism coupled to the cable wheel and being freely rotatable in at least one direction to a selected position to rotate the wheel and draw the cable for bowing the resilient lumbar grid, the clutch mechanism operable to lock at said selected position to maintain the bowed lumbar grid in a loaded state;

the cable wheel including an elongated radial portion which provides an effective moment arm greater than another effective moment arm created by another portion of the wheel, the elongated radial portion effectively reducing the rotational force required to rotate the cable wheel and draw the cable as the lumbar grid is bowed for providing lumbar support to a seated person.

* * * * *